(12) United States Patent
Yun et al.

(10) Patent No.: US 6,733,923 B2
(45) Date of Patent: May 11, 2004

(54) METAL OXIDE ELECTRODE COATED WITH POROUS METAL FILM, POROUS METAL OXIDE FILM OR POROUS CARBON FILM, ITS FABRICATION METHOD, AND LITHIUM-ION SECONDARY BATTERY USING IT

(75) Inventors: Kyung-Suk Yun, Seoul (KR); Byung-Won Cho, Seoul (KR); Won-Il Cho, Seoul (KR); Hyung-Sun Kim, Seoul (KR); Un-Seok Kim, Seoul (KR); Sang-Cheol Nam, Seoul (KR); Seung-Won Lee, Seoul (KR); Young-Soo Yoon, Kyoungki-Do (KR)

(73) Assignee: Korea Institute of Science and Technology, Seoul (KR)

( * ) Notice: Subject to any disclaimer, the term of this patent is extended or adjusted under 35 U.S.C. 154(b) by 322 days.

(21) Appl. No.: 09/934,648

(22) Filed: Aug. 23, 2001

(65) Prior Publication Data
US 2003/0039887 A1 Feb. 27, 2003

(51) Int. Cl.$^7$ ................................................ H01M 4/58
(52) U.S. Cl. .............................. 429/231.9; 429/231.95; 429/231.5; 29/623.1; 29/623.5; 427/77; 427/124; 427/123; 427/126.3; 427/126.6; 427/243; 427/245; 427/350

(58) Field of Search .......................... 429/231.9, 231.95, 429/231.5; 29/623.1, 623.5; 427/77, 124, 123, 126.3, 126.6, 243, 245

(56) References Cited

U.S. PATENT DOCUMENTS 6,458,487 B1 * 10/2002 Takeuchi et al. ............. 429/224

OTHER PUBLICATIONS

G.G. Amatucci et al., "Surface treatments of $Li_{1+x}Mn_{2-x}O_4$ spinels for improved elevated temperature performance", Solid State Ionics 104, pp. 13–25, 1997.

Soonho Ahn et al., "Development of high capacity, high rate lithium ion batteries utilizing metal fiber conductive additives", Journal of Power Sources 81–82, pp. 896–901, 1999.

* cited by examiner

*Primary Examiner*—Bruce F. Bell
(74) *Attorney, Agent, or Firm*—Morrison & Foerster LLP

(57) ABSTRACT

A metal oxide electrode coated with a porous metal film, a metal oxide film or a carbon film, its fabrication method and a lithium-ion secondary battery using it are disclosed. The porous thin film of Li, Al, Sn, Bi, Si, Sb, Ni, Cu, Ti, V, Cr, Mn, Fe, Co, Zn, Mo, W, Ag, Au, Pt, Ir, Ru, carbon or their alloys are coated to a few Å~a few μm, so as to remarkably improve the capacity of a battery, high rate charging and discharging characteristics and a durability characteristic. The method can be applied to a fabrication of every secondary battery.

7 Claims, 3 Drawing Sheets

METAL OXIDE ELECTRODE COATED WITH POROUS METAL FILM, POROUS METAL OXIDE FILM OR POROUS CARBON FILM, ITS FABRICATION METHOD, AND LITHIUM-ION SECONDARY BATTERY USING IT

BACKGROUND OF THE INVENTION

1. Field of the Invention

The present invention relates a metal oxide electrode coated with a porous metal film, a metal oxide film or a carbon film, its fabrication method and a lithium-ion secondary battery using it.

2. Description of the Background Art

A cathode for lithium-ion secondary battery comprises a metal oxide active material for releasing and inserting lithium, a conductive material added to give conductivity, and a coupling material for fixing the metal oxide active material and the conductive material to an aluminum collecting body.

Since an electric conductivity varies depending on a particle size of the active material and a filling density, content and type of the conductive material and the coupling material, it is necessary to consider from a comprehensive view.

Among them, the metal oxide used as a cathode active material for a lithium-ion secondary battery has a bad electric conductivity due to its material characteristic, the role of the conductive material is crucial in view of smoothly supply electrons between packed active materials and from the collecting body to the surface of the active material (D. Linden, Handbook of Batteries, McGRAW-HILL INC., New York (1995)).

As the material oxide cathode, $LiCoO_2$, $LiMn_2O_4$, $LiNiO_2$, $V_6O_{13}$, $V_2O_5$ and the like are used. These have a low electric conductivity, so that in order to be used as an electrode, a conductive material such as acetylene black, carbon black or graphite should be used and a further amount of conductive material should be added.

With the increase of the addition amount of the conductive material, the amount of the coupling material is accordingly increased, and thus, an optimization for the amount of the added conductive material and the coupling material is needed, according to which a difference in a battery performance occurs.

For example, if the combination of the active material, the conductive material and the coupling material is not uniform, performance difference between electrodes resulted in a uniformity of the electrode performance, causing a problem of a reliability of the battery.

The coupling material serves to prevent desorption of the active material and heighten a bonding force between the active materials, but if added more than required, a battery performance is degraded due to reduction of the electrode active material and increase of an internal resistance.

Thus, there is a restriction to heighten the battery performance only with increase of the amount of the conductive material.

A conventional lithium-ion secondary battery uses a compound which includes lithium such as $LiCoO_2$ or $LiMn_2O_4$ as a cathode. Thus, such a battery is fabricated without having lithium in carbon electrode used as an anode.

In case of the use of carbon electrode in a lithium-ion secondary battery, in the initial charging of the battery, a passive film is formed on the surface of the carbon electrode. The passive film interrupts so that an organic solvent is not inserted between the carbon grid layer, thereby restraining a dissolution reaction of the organic solvent, and thus, the passive film improves a stabilization of the carbon structure and the reversibility of the carbon electrode, making it possible to use the carbon electrode as a lithium-ion secondary anode.

However, such formation of a passive film is an irreversible reaction, bringing about a contrary effect that it causes the consumption of the lithium ions and thereby a reduction in the capacity of the battery.

In addition, a charging and discharging efficiency of the carbon electrode and the cathode is not completely 100%, as the cycle proceeds, lithium ion is consumed to cause a reduction in the electrode capacity, resulting in that the life cycle of the battery is degraded.

SUMMARY OF THE INVENTION

Therefore, an object of the present invention is to provide a porous metal oxide film or a porous carbon film, its fabrication method and a lithium-ion secondary battery using it, that are capable of increasing a capacity by compensating a capacity degradation due to an irreversible capacity in the carbon electrode generated at the initial stage of charging of the lithium-ion secondary battery, and capable of improving a life cycle by compensating for the amount of lithium consumed due to a low efficiency in charging and discharging.

To achieve these and other advantages and in accordance with the purpose of the present invention, as embodied and broadly described herein, there is provided a metal oxide electrode for a lithium-ion secondary battery, coated with a porous metal layer, a porous metal oxide layer or a porous carbon layer thin film having a thickness of a few Å~a few $\mu$m.

To achieve the above object, there is further provided a method for fabricating a metal oxide electrode coated with a porous metal, metal oxide or carbon, including the steps of: positioning a metal oxide electrode roll within a vacuum chamber; winding the metal oxide electrode off the roll at a certain speed, winding the metal oxide electrode on a different roll and coating porous metal or carbon with a thickness of a few Å~a few $\mu$m on the metal oxide electrode between the two rolls from a metal or carbon evaporation source; and stabilizing the metal oxide electrode in a vacuum state for a predetermined time period at a predetermined temperature.

To achieve the above object, there is further provided a lithium-ion secondary battery including a cathode fabricated with an active material such as $LiCoO_2$, $LiMn_2O_4$, $LiNiO_2$, $V_6O_{13}$, $V_2O_5$ and the like, and coated with a porous metal or a carbon thin film with a thickness of a few Å~a few $\mu$m, and an anode fabricated with an active material such as graphite, coke or hard carbon.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1A:
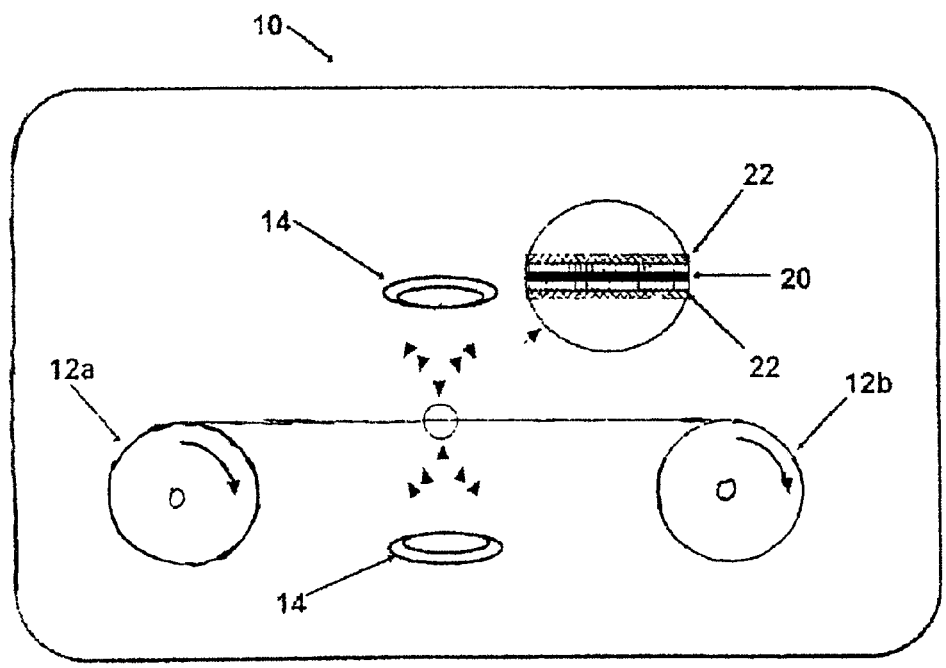
FIGS. 1A and 1B are schematic views showing a method for processing the surface of a metal oxide electrode in accordance with a preferred embodiment of the present invention.

FIG. 1A is a schematic view showing a method for processing the surface of a metal oxide electrode in accordance with a preferred embodiment of the present invention.

In order to coat a porous metal film, porous metal oxide layer or a porous carbon layer on the surface of a metal oxide electrode 20, a roll 12 (a supply roll) of a metal oxide electrode material for forming a metal oxide electrode for a lithium-ion battery is positioned in a vacuum chamber 10 and the chamber 10 is put under a vacuum. Then, A porous metal film or carbon 22 is deposited on both surfaces of the metal oxide electrode from a metal or carbon evaporation sources 14 by using a heating deposition process, an electron beam deposition process, an ion line deposition process, a sputtering deposition process or a laser ablation process.

At this time, the roll 12a of metal oxide electrode material is gradually wound off to be wound onto another roll 12b, so that an even thickness of the porous metal layer or carbon layer can be coated on the surfaces thereof.

In this respect, by controlling the winding rate and the deposition rate of the metal, a few Å~a few $\mu$m thickness of porous metal or carbon thin film 22 can be deposited on the surfaces thereof.

That is, by this method, the coating rate and the coating amount of the porous metal film, the porous oxide layer or the carbon layer can be controlled. In addition, different types of porous metal, metal oxide or carbon and different evaporation rates may be selected to be deposited to obtain different types and alloys of porous metal or carbon and alloy composition.

After the porous metal, metal oxide or carbon thin film is coated, it is stabilized for a predetermined time in a vacuum state at a predetermined temperature, so that a stable porous metal or carbon film is formed on the surfaces of the metal oxide electrode to improve the irreversibility and conductivity of the metal oxide electrode and the high rate charging and discharging characteristics are improved by heightening the conductivity.

Figure 1B:
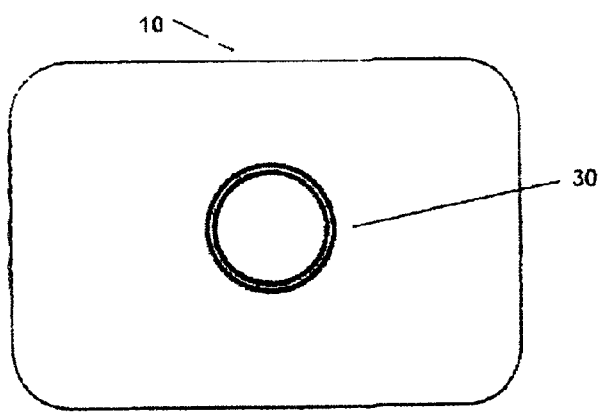

FIG. 1B shows a stabilization of the metal oxide electrode 30 coated with the porous metal or carbon thin film.

The coated porous metal film may be of Li, Al, Sn, Bi, Si, Sb, Ni, Cu, Ti, V, Cr, Mn, Fe, Co, Zn, Mo, W, Ag, Au, Pt, Ru, Ir, their alloys or oxides.

Types of carbon such as graphite, coke, hard carbon, acetylene black, carbon black or active carbon are used.

Especially, in case of coating lithium or lithium alloy, since lithium is evenly dispersed and intercalated in the metal oxide electrode thanks to a stabilizing process, the characteristic of the electrode is improved.

When a lithium-ion secondary battery is fabricated with the lithium metal oxide electrode or the metal oxide electrode coated with a lithium alloy, the capacity degradation due to the irreversible capacity loss (ICL) in the metal oxide electrode which occurs at the initial stage of charging is prevented, resulting in an increase in the capacity.

In addition, the amount of lithium which is consumed due to the low efficiency in charging and discharging is compensated for, so that the life cycle can be improved.

The present invention has advantages that a desired signal metal, metal oxide, carbon or their alloys may be coated freely, a pure porous metal can be coated without external contamination, the deposition rate can be controlled freely to control the evenness of the film and deposition time, and all the processes may be performed in an automatic system.

When the porous metal film, the metal oxide or carbon film is coated on the surfaces of the metal oxide electrode, its electrical conductivity is improved, so that a current and a dislocation distribution degree can be constant, and thus, a local overcharging reaction is restrained. Accordingly, the use rate of the electrode and the life cycle can be increased. In addition, thanks to the porous film, the lithium ion movement speed is not degraded, and when the coated electrode is adopted to a large-scale battery, its effect is highly increased.

The stabilization time is different depending on the type of the coated porous metal, the metal oxide or the carbon. Generally, it should be suitably maintained in a vacuum atmosphere lower than $10^1$ torr at a temperature of 20° C.~100° C. for 1 hour to 24 hours.

The metal oxide electrode to be used is fabricated from an active material such as $LiCoO_2$, $LiMn_2O_4$, $LiNiO_2$, $V_6O_{13}$ or $V_2O_5$, likewise to conventional materials used in the lithium-ion battery, and the anode is fabricated from an active material such as graphite, coke, hard carbon, to fabricate a lithium-ion secondary battery.

Next, examples and comparative example of the fabrication of the metal oxide electrode coated with the porous metal, metal oxide or carbon and of lithium-ion secondary batteries made therefrom and of tests of their performance will be described, to aid in an understanding of the invention.

EXAMPLE 1

In case of fabricating a $LiCoO_2$ cathode, a composition of 5.7 g of $LiCoO_2$, 0.6 g of acetylene black (AB), 0.4 g of polyvinyledene-fluoride (termed as 'PVdF', hereinafter) were mixed in a suitable amount of NMP (N-methyl-2-pyrrolidinone) and acetone. When an adequate viscosity was obtained, the resulting solution was cast on a aluminum thin film, dried and rolled to obtain the electrode material.

Using the technique shown in FIG. 1A, silver metal was coated to a thickness of about 2000 Å on both surfaces of the electrode material by a heating deposition process, and stabilized under a vacuum state at room temperature for 12 hours, to thereby obtain material for metal oxide electrode coated with porous metal.

In case of carbon cathode, a composition of 6 g of Gr, 0.3 g of AB and 0.4 g of PVdF were mixed in a suitable amount of NMP (N-methyl1-2-pyrrolidinone) and acetone. When an adequate viscosity was obtained, the resulting solution was cast on a copper thin plate, dried and rolled to obtain the electrode material.

A lithium-ion secondary battery was fabricated such that a metal oxide cathode coated with silver metal, a PP separating film and a carbon anode were stacked, to which an ethylene carbonate-diethyl carbonate (termed as 'EC-DEC', hereinafter) solution in which 1 M $LiPF_6$ had been dissolved was injected. And then, the electrode capacity and life cycle were checked on the basis of the charging/discharging rate C/3 cathode.

COMPARATIVE EXAMPLE

In the case of fabricating a $LiCoO_2$ anode, a composition of 5.7 g of $LiCoO_2$, 0.6 g of AB and 0.4 g of PVdF were mixed with a suitable amount of NMP and acetone. When an adequate viscosity was obtained, the resulting solution was cast on an aluminum thin plate, dried and rolled to obtain a material for an electrode.

In the case of fabricating a carbon cathode, a composition of 6 g of Gr, 0.3 g of AB and 0.4 g of PVdF were mixed in a suitable amount of NMP and acetone. When an adequate viscosity was obtained, the resulting solution was cast on a copper thin plate, dried and rolled to obtain the electrode material.

A lithium-ion secondary battery was constructed such that a PP separating film, the $LiCoO_2$ anode and the carbon cathode were stacked, to which EC-DEC solution in which 1M $LiPF_6$ has been dissolved was injected. And then, the electrode capacity and life cycle were checked on the basis of the charging/discharging rate C/3 cathode.

EXAMPLE 2

In the case of fabricating a $LiCoO_2$ cathode, a composition of 5.7 g of $LiCoO_2$, 0.6 g of AB and 0.4 g of PVdF was mixed with a suitable amount of NMP and acetone. When an adequate viscosity was obtained, the resulting solution was cast on an aluminum thin plate, dried and rolled to obtain the electrode material.

Using the technique shown in FIG. 1A, graphite was coated to the thickness of about 2000 Å on both surfaces of the electrode material by sputtering method, stabilized under a vacuum state at room temperature for 12 hours, to thereby obtain metal oxide electrode coated with porous graphite.

In case of a carbon cathode, a composition of 6 g of Gr, 0.3 g of AB and 0.4 g of PVdF is mixed in a suitable amount of NMP and acetone. When an adequate viscosity was obtained, the resulting solution was cast on a copper thin plate, dried and rolled to obtain an electrode.

A lithium-ion secondary battery was fabricated such that the metal oxide cathode coated with graphite, a PP separating film and carbon anode were stacked, to which EC-DEC solution in which 1M $LiPF_6$ had been dissolved was injected. And then, the electrode capacity and life cycle were checked on the basis of the charging/discharging rate C/3 cathode.

EXAMPLE 3

In the case of fabricating a $LiCoO_2$ cathode, a composition of 5.7 g of $LiCoO_2$, 0.6 g of AB and 0.4 g of PVdF were mixed with a suitable amount of NMP and acetone. When an adequate viscosity was obtained, the resulting solution was cast on an aluminum thin plate, dried and rolled to obtain an electrode.

Using the technique shown in FIG. 1A, lithium-aluminum metal is coated to a thickness of about 2000 Å on both surfaces of the electrode by a heating deposition process, and then stabilized under a vacuum state at room temperature for 12 hours, to thereby obtain a metal oxide electrode coated with a porous alloy.

In case of a carbon anode, a composition of 6 g of Gr, 0.3 g of AB and 0.4 g of PVdF were mixed in a suitable amount of NMP and acetone. When an adequate viscosity was obtained, the resulting solution was cast on a copper thin plate, dried and rolled to obtain a material for an electrode.

A lithium-ion secondary battery was fabricated such that the metal oxide cathode coated with a lithium-aluminum alloy, a PP separating film and the carbon anode were stacked, to which EC-DEC solution in which 1M $LiPF_6$ had been dissolved was injected. And then, the electrode capacity and life cycle were checked on the basis of the charging/discharging rate C/3 cathode.

Figure 2:
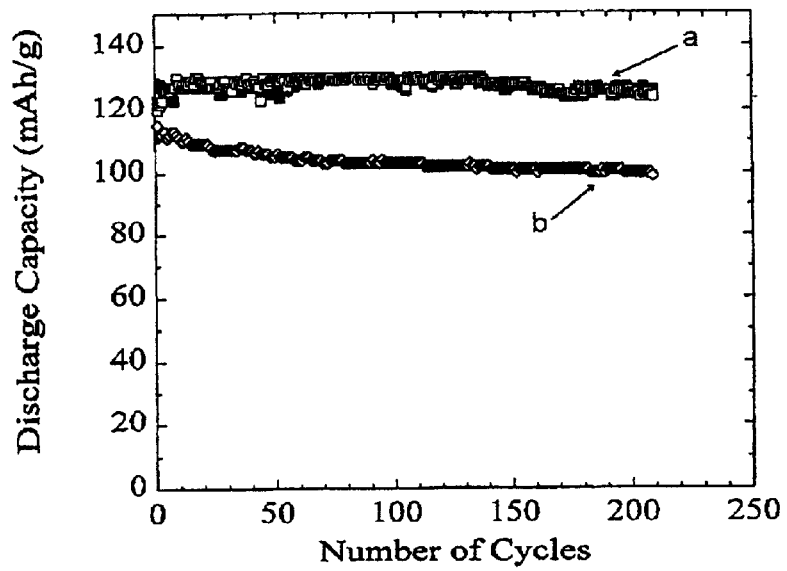
FIG. 2 is a graph showing the electrode capacity and life testing results of the lithium-ion secondary battery fabricated with a metal oxide electrode in accordance with the preferred embodiment of the present invention and that of Comparative Example 1.

FIG. 2 is a graph showing the electrode capacity (on the basis of the $LiCoO_2$ active material) and life cycle characteristics of the lithium-ion secondary batteries fabricated by adopting the above-described method of Example 1 according to the present invention and of comparative Example.

As shown in FIG. 2, the batteries fabricated according to the method of the preferred embodiment of the present invention exhibited the excellent electrode capacity and life cycle characteristics (a). In comparison, however, the battery fabricated according to the method of comparative example exhibited somewhat degraded electrode capacity and life cycle characteristics (b).

Figure 3A:
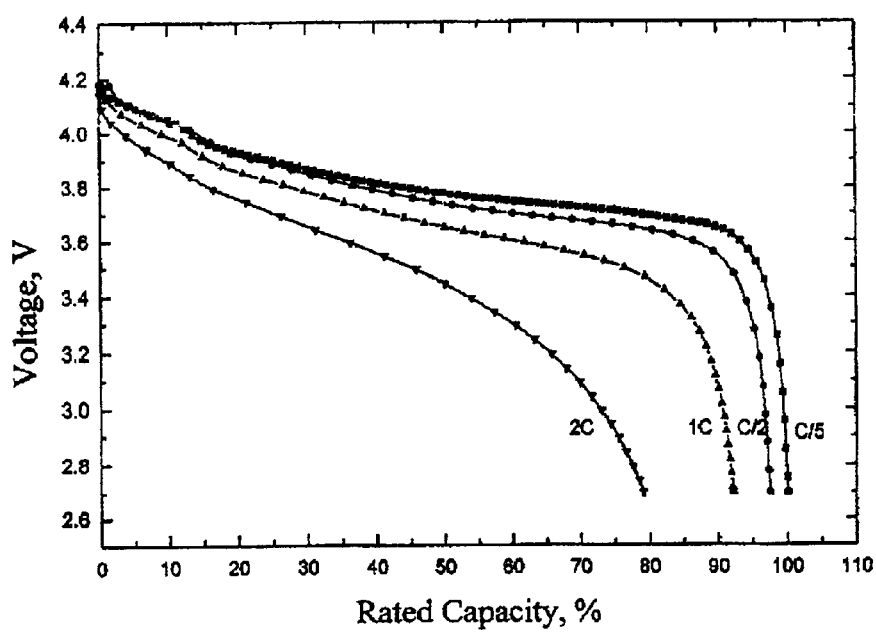
FIGS. 3A and 3B are graphs showing the high rate discharging characteristics of the lithium-ion secondary battery fabricated the metal oxide electrode in accordance with the preferred embodiment of the present invention and that of Comparative Example.
Figure 3B:
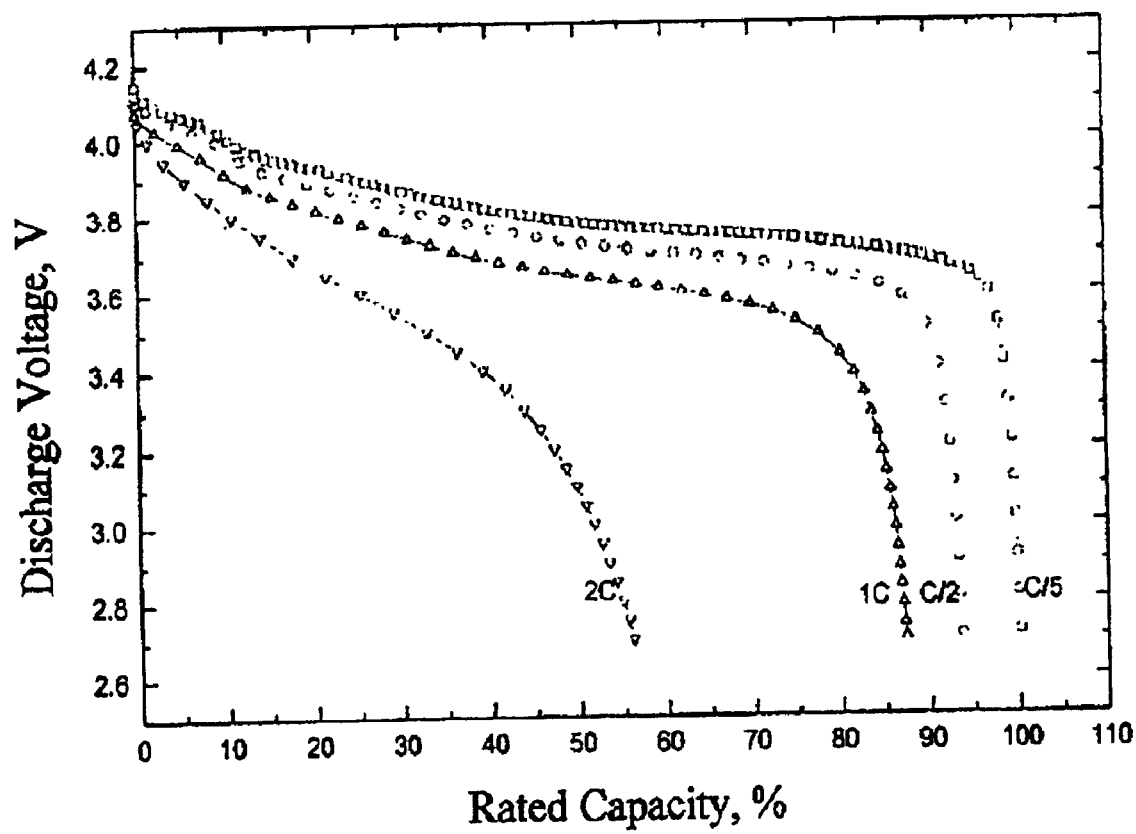

FIGS. 3A and 3B are graphs showing the high rate discharging characteristics of the lithium-ion secondary batteries fabricated in method of example 2 and comparative example.

As shown in FIGS. 3A and 3B, the lithium-ion secondary battery fabricated by adopting the method of the present invention exhibits the excellent high rate discharging characteristics.

As so far described, the metal oxide electrode coated with porous metal film, metal oxide or carbon thin film, their fabrication method and the lithium-ion secondary battery using the same have the following advantages.

For example, first, the capacity degradation due to the irreversible capacity of the carbon electrode appearing at the initial stage of charging can be compensated, so that the capacity can be increased.

Secondly, since the amount of the lithium consumed due to the bad efficiency of charging and discharging is compensated, the metal oxide electrode and lithium-ion secondary battery with highly improved life cycle can be provided as well as its method.

Accordingly, the metal oxide electrode coated with porous metal film and its fabrication method and a lithium-ion secondary battery using the same are advantageously applicable to various industrial sectors such as various compact-size electronic appliances, communication appliances, or power source of an electric automobile.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A electrode of a secondary battery comprising a porous film on a metal oxide electrode, wherein the porous film consists essentially of a metal, a metal oxide or a carbon, and the metal oxide electrode comprises an active material selected from the group consisting essentially of $LiCoO_2$, $LiNiO_2$, $V_6O_{13}$, $V_2O_5$ and a combination thereof.

2. A lithium-ion secondary battery comprising:
the electrode of claim 1 and an anode comprising a carbon material selected from the group consisting of graphite, coke, hard carbon and a combination thereof.

3. A method for fabricating an electrode-comprising:
positioning a sheet of a metal oxide electrode within a vacuum chamber;
coating a film of a porous metal, a metal oxide or carbon on a surface of the sheet of the metal oxide electrode; and
stabilizing the film under a vacuum.

4. The method of claim 3, wherein the film is coated by a process selected from the group consisting of a heating deposition process, an electron beam deposition process, an ion line deposition process, a sputtering deposition process, a laser ablation process, and a combination thereof.

5. The method of claim 3, wherein the porous metal comprises a metal or a metal alloy selected from the group consisting of lithium, aluminum, tin, bismuth, silicon, antimony, nickel, copper, titanium, vanadium, chrome, manganese, iron, cobalt, zinc, molybdenum, tungsten, silver, gold, platinum, iridium, ruthenium and a combination thereof.

6. The method of claim 3, wherein the vacuum is a vacuum of below $10^{-1}$ torr at a temperature of 20° C.~100° C. for 1~24 hours.

7. The method of claim 3, wherein the metal oxide electrode comprises an active material selected from the group consisting of $LiCoO_2$, $LiMn_2O_4$, $LiNiO_2$, $V_6O_{13}$, $V_2O_5$ and a combination thereof.

* * * * *